US007308204B2

(12) United States Patent
Hayashi et al.

(10) Patent No.: US 7,308,204 B2
(45) Date of Patent: Dec. 11, 2007

(54) NOISE SUPPRESSING METHOD AND APPARATUS THEREOF

(75) Inventors: Michiaki Hayashi, Saitama (JP); Hideaki Tanaka, Saitama (JP)

(73) Assignee: KDDI Corporation, Tokyo (JP)

( * ) Notice: Subject to any disclaimer, the term of this patent is extended or adjusted under 35 U.S.C. 154(b) by 436 days.

(21) Appl. No.: 10/849,298

(22) Filed: May 19, 2004

(65) Prior Publication Data

US 2004/0234276 A1 Nov. 25, 2004

(30) Foreign Application Priority Data

May 23, 2003 (JP) ............................. 2003-145727

(51) Int. Cl.
*H04B 10/00* (2006.01)
(52) U.S. Cl. ...................... 398/152; 398/184; 398/195
(58) Field of Classification Search ........ 398/202–214, 398/152, 184, 195
See application file for complete search history.

(56) References Cited

U.S. PATENT DOCUMENTS 6,493,473 B1 * 12/2002 Wooten ........................ 385/11

6,678,431 B2 * 1/2004 Han et al. ..................... 385/11

OTHER PUBLICATIONS

Ooi, et al., "40-Gb/s WDM Transmission With Virtually Imaged Phased Array (VIPA) Variable Dispersion Compensators" Journal of Lightwave Technology, vol. 20, No. 12, Dec. 2002, pp. 2196-2203.

* cited by examiner

*Primary Examiner*—Agustin Bello
(74) *Attorney, Agent, or Firm*—Christie, Parker & Hale, LLP

(57) ABSTRACT

In the invention, an input light including a signal light and a noise light within a signal wavelength band of the signal light is divided into a first component with a polarization parallel to a polarization direction of the signal light and a second component with a polarization orthogonal to the polarization direction of the first component. The first component is supplied into a first arm and the second component into a second arm. The optical phase of the second component in the second arm is shifted so that the optical phase of the second component in the second arm relatively differs by π from the optical phase of the first component in the first arm. The first component output from the first arm and the second component output from the second arm are combined to make the noise lights included in the first and second components interfere with each other.

15 Claims, 7 Drawing Sheets

NOISE SUPPRESSING METHOD AND APPARATUS THEREOF

CROSS REFERENCE TO RELATED APPLICATIONS

This application claims priority to Japanese Patent Application No. 2003-145727, filed May 23, 2003, the entire contents of which are incorporated herein by reference.

FIELD OF THE INVENTION

This invention relates to a method and apparatus to suppress optical noise components within a signal band.

BACKGROUND OF THE INVENTION

In an optical transmission system, specifically in an optical amplifier transmission system, amplified spontaneous emission (ASE) noises are accumulated due to the optical amplification in the course of optical transmission. The ASE noises within a band different from the signal wavelength band are easily removed by a band limited optical filter. However, this type of band limited optical filter is incapable of removing the ASE noises being superimposed on the signal wavelength band.

An ASE noise accumulated within a signal band deteriorates an optical signal to noise ratio, i.e. OSNR, of a signal light. FIG. 2 shows a spectrum example of a signal light in which an ASE noise is accumulated. The horizontal axis expresses the wavelength, and the vertical axis expresses the optical intensity. The solid line shows the optical intensity of the signal component, and the broken line shows the optical intensity of the noise component. However, the actual intensity of the signal component is obtained by subtracting the intensity of the noise component expressed by the broken line from the intensity of the signal light expressed by the solid line. The noise light within the signal band deteriorates a bit error rate, i.e. BER of the signal light.

SUMMARY OF THE INVENTION

According to one embodiment of the invention, an input light including a signal light and a noise light within a signal wavelength band of the signal light is divided into a first component with a polarization parallel to a polarization direction of the signal light and a second component with a polarization orthogonal to the polarization direction of the first component. The first component is supplied into a first arm and the second component into a second arm. The optical phase of the second component in the second arm is shifted so that the optical phase of the second component in the second arm differs by π from the optical phase of the first component in the first arm, that is, shifted in such a way that the optical phase of the second component (the noise component) in the second arm becomes opposite to the optical phase of the noise component included in the first component in the first arm. Thereafter, the first component output from the first arm and the second component output from the second arm are combined. While the combining is performed, the noise lights included in the first and second components are forced to interfere with each other.

Basically, the first component in the first arm is composed of the signal light and a half of the noise component, and the second component in the second arm is composed of the other half of the noise component. As the second component is reversed in its optical phase and combined with the first component, the noise components within the signal band are forced to interfere with each other to become weak. Consequently, the noise light within the signal band is suppressed.

Preferably, the polarization of the input light should be adjusted in advance of the input light being divided into the first component and the second component. Because of this operation, the signal light is precisely assigned to the first component.

By using a spectral delay which has a delay amount to differ according to a wavelength in order to shift the optical phase of the second component, it is possible to shift the optical phase of a noise component by a desired amount in each wavelength within the signal band. This makes the interference between the noise components at the combination more effectively.

In addition, preferably, the polarization of the second component in the second arm is adjusted to maximize an OSNR of the combined light. With this operation, it is possible to reduce the influence from the polarization fluctuation of the second component in the second arm. More specifically, the polarization of the second component in the second arm is adjusted to minimize the intensity of the component with the polarization orthogonal to the polarization direction of the signal light included in the combined light. Alternatively, the polarization direction of the second component in the second arm is adjusted to maximize a degree of polarization of the combined light.

Furthermore, preferably, the combined light is divided into a third component with the polarization parallel to the polarization direction of the signal light included in the combined light and a fourth component the polarization orthogonal to the polarization direction of the third component, the polarization of the first component in the first arm is adjusted to maximize the intensity of a base repetition frequency component of the signal obtained from the third component, and the polarization of the second component in the second arm is adjusted to minimize the intensity of a low frequency component obtained from the fourth component. With this operation, the influence from the polarization fluctuation in the first and second arms can be reduced.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
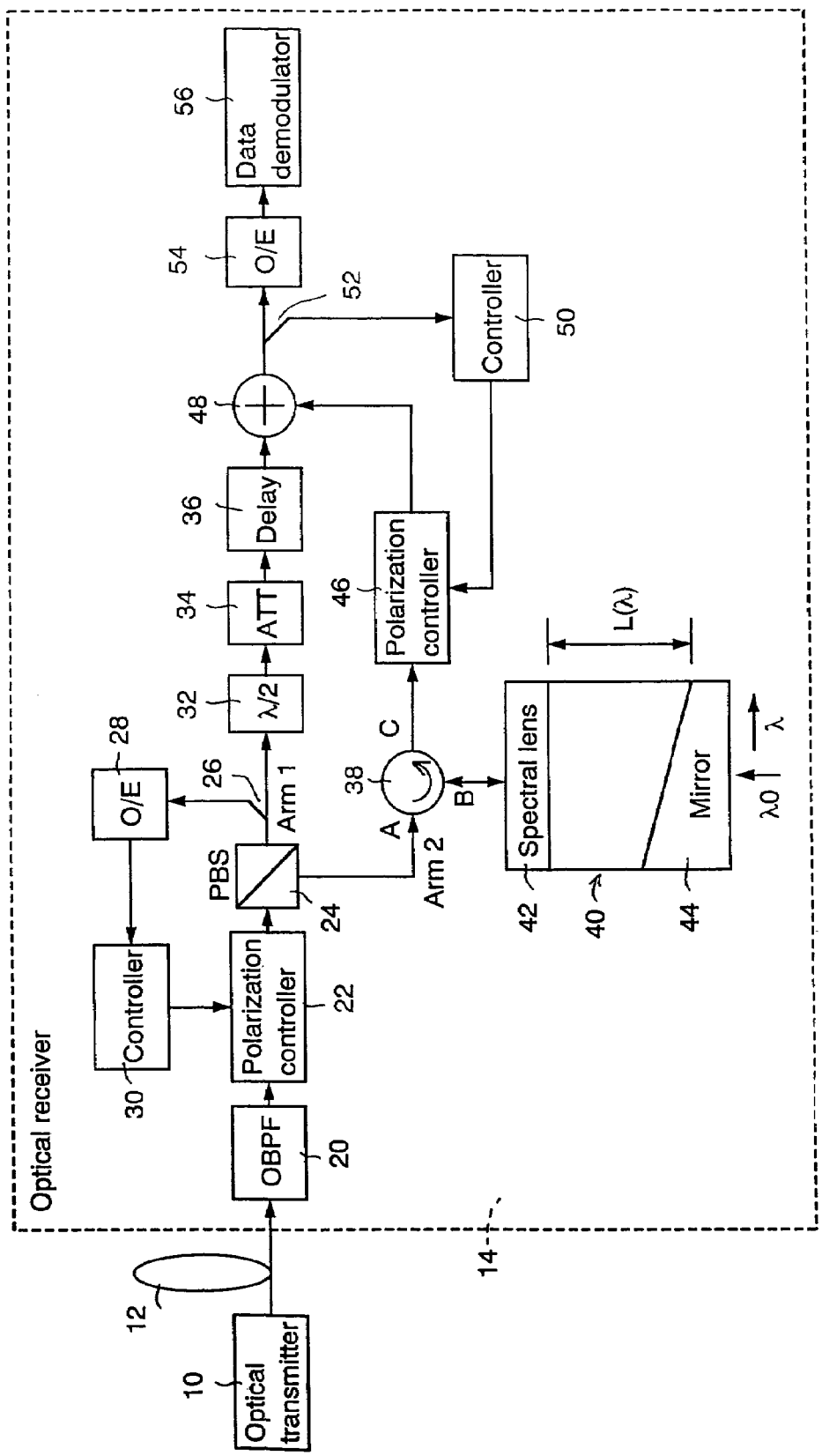
FIG. 1 is a schematic block diagram of an explanatory embodiment according to the invention.

FIG. 1 shows a schematic block diagram of an explanatory embodiment according to one embodiment of the invention. An optical transmitter 10 outputs a signal light of linear polarization into an optical fiber transmission line 12. The optical fiber transmission line 12 typically comprises an optical repeater amplifier transmission line including one or more optical amplifiers. The signal light propagated in the optical fiber transmission line 12 enters an optical receiver 14. To make it more easily understandable, the receiving configuration of a single wavelength is illustrated as the optical receiver 14.

Figure 2:
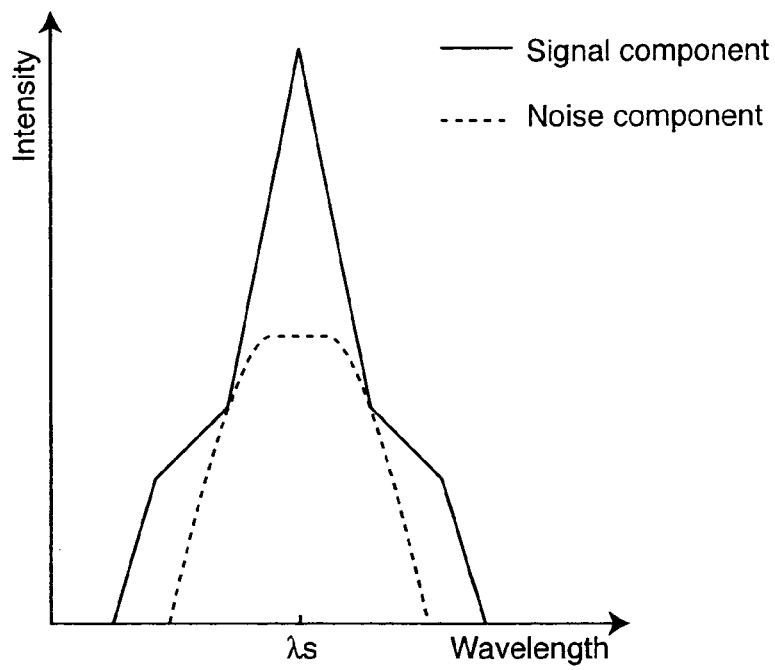
FIG. 2 is a spectrum example of a signal light in which an ASE noise is accumulated in the signal band.

The configuration and operation of the optical receiver 14 is explained below. An optical bandpass filter (OBPF) 20 extracts a component of signal wavelength band out of the input light from the optical fiber transmission line 12. The output light from the OBPF 20 is applied to a polarization controller 22. As shown in FIG. 2, the spectrum of the output light from the OBPF 20 shows a spectrum wherein an ASE noise is accumulated in the signal wavelength band. The passband width of the OBPF 20 is for example approximately 1 nm.

The polarization controller 22 controls a polarization direction of the output light from the OBPF 20 so that the polarization direction of the output light, especially the signal light from the OBPF 20 coincides with a specific polarization direction of a polarization beam splitter (PBS) 24. The PBS 24 splits the output light from the polarization controller 22 into two orthogonal polarization components and applies one of the polarization components (e.g. P-wave), namely a first component into an arm 1 (branch 1) and the other (e.g. S-wave), namely a second component to an arm 2 (branch 2).

A divider 26 in the arm 1 applies apart of the P-wave component from the PBS 24 into an optoelectric (O/E) converter 28 and the rest of the P-wave component to half wavelength plate 32. The half wavelength plate 32 converts the P-wave from the divider 26 into an orthogonal S-wave.

A controller 30 controls the polarization controller 22 according to the output from the O/E converter 28 so as to maximize the output from the O/E converter 28. As a result of this polarization control, the PBS 24 applies the first component, which comprises the signal light and ASE noise component with a polarization direction (P-wave) identical to the polarization direction of the signal light, into the arm 1 and the second component, which comprises the ASE noise component with a polarization direction (S-wave) orthogonal to the polarization direction of the signal light, into the arm 2.

Since the polarization of the ASE nose accumulated within the signal wavelength band in the optical transmission line 12 is not fixed, both of the ASE noise component (P-wave) in the arm 1 and ASE component (S-wave) in the arm 2 split by the PBS 24 do not necessarily have the same intensity. The ratio between the ASE noise component in the arm 1 and the ASE noise component in the arm 2 varies with time. However, on average, on a long-term basis, the intensity of the ASE noise components in both arms 1 and 2 becomes almost the same.

Figure 3:
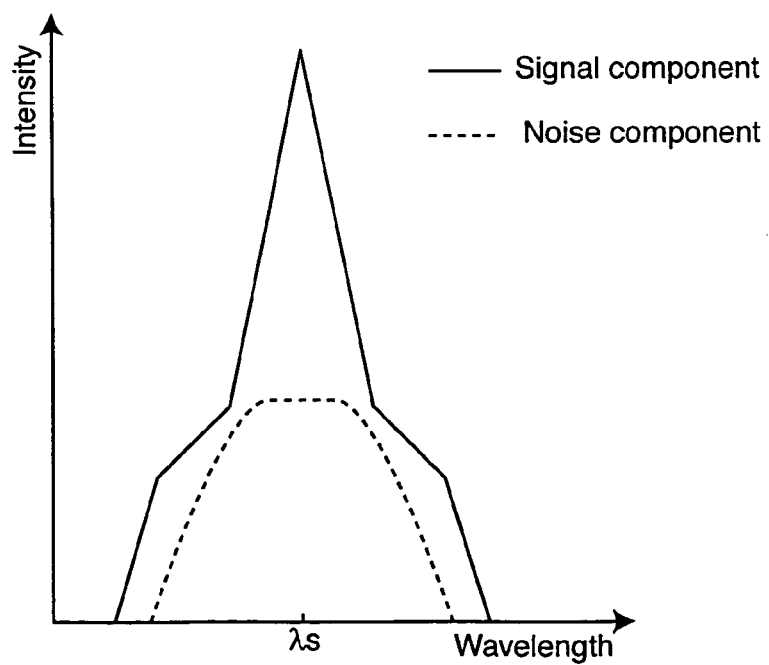
FIG. 3 is a spectrum example of a light in a first arm which is separated from the PBS of FIG. 1.
Figure 4:
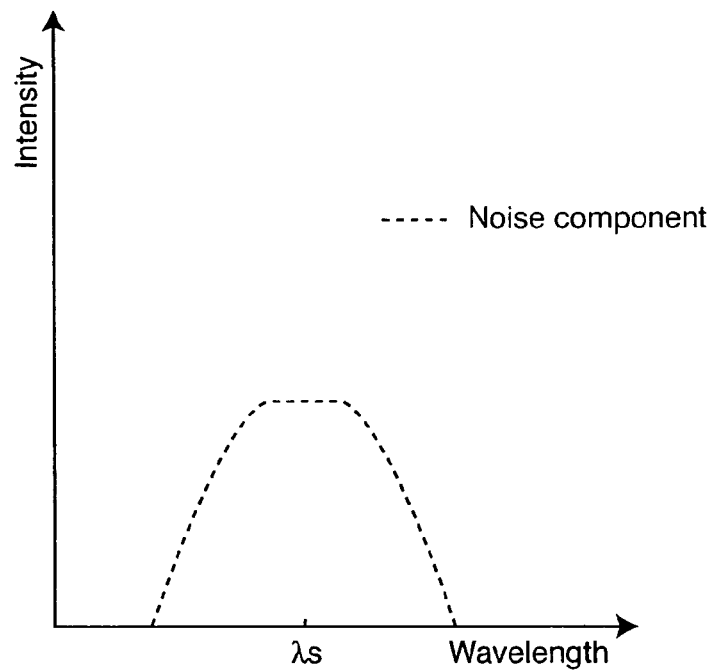
FIG. 4 is a spectrum example of a light in a second arm split by the PBS of FIG. 1.

According to the structure up to this point, the ASE noise within the signal wavelength band is split into two portions and one portion is applied to the arm 1 and the other to the arm 2. FIG. 3 shows a spectrum example of the polarization component in the arm 1, and FIG. 4 shows a spectrum example of the polarization component in the arm 2. In FIGS. 3 and 4, the horizontal axis expresses the wavelength and the vertical axis expresses the intensity. In the average on a long-term basis, the intensity of the ASE noise in both arms 1 and 2 becomes a half of the intensity of the ASE noise included in the output light from the OBPF 20.

In the arm 1, an attenuator 34 for level-adjusting and a delay 36 for time-adjusting are further disposed. The order of the half wavelength plate 32, the attenuator 34, and the delay 36 is not limited to the illustrated example.

In the arm 2, an optical circulator 38 is disposed. The ASE noise component (S-wave) from the PBS 24 enters a port A of the optical circulator 38 and outputs through a port B into a spectral delay 40 which has delay characteristics depending on a wavelength. The spectral delay 40 comprises a spectral lens 42 and a mirror 44 to send back the lights of respective wavelengths divided by the spectral lens 42 to the spectral lens 42. Since the optical path length between the spectral lens 42 and the mirror 44 is varied depending on a wavelength, the spectral delay 40 can give wavelength depending delay to the input light. The amount of the wavelength depending delay of the spectral delay 40, namely the amount of the optical phase shift, is set so that the optical phase of the second component (the ASE noise) output from the arm 2 relatively differs by $\pi$ from the optical phase of the ASE noise included in the first component output from the arm 1 in a combiner 48, which is explained below. The spectral delay 40 shifts the optical phase of the ASE noise from the optical circulator 38 according to its wavelength and sends back the ASE noise with the shifted optical phase to the optical circulator 38.

An optical device capable of performing such function as the spectral delay 40 is for example a virtually imaged phased array (VIPA) variable dispersion compensator described in H. Ooi et al., "40-Gb/s WDM Transmission With Virtually Imaged Phased Array (VIPA) Variable Dispersion Compensators", IEEE Journal of Light wave Technology, vol. 20, No. 12, 2002.

The distance $L(\lambda)$ between the spectral lens 42 and the mirror 44 of the spectral delay 40 is expressed as the following equation;

$$L(\lambda) = ((\lambda - \lambda 0)/2 + L0)/2,$$

where $$L0 = 0.5\lambda 0 + \Delta L,$$

and $\Delta L$ expresses the difference between the optical path length of the arm 1 which is from the PBS 24 to the combiner 48 and the optical path length of the arm 2 which is from the PBS 24 to the combiner 48 except the optical path length between the spectral lens 42 and the mirror 44 in the spectral delay 40. $\lambda 0$ is a reference wavelength of the spectral delay 40 and identical to the wavelength $\lambda s$, for example. Accordingly, when the light propagated through the arm 1 and the light propagated through the arm 2 are combined as described later on condition that the distance $L(\lambda)$ between the spectral lens 42 and the mirror 44 is adjusted depending on the wavelength $\lambda$, the ASE noise superimposed on the signal wavelength band can be reduced by 6 dB on the average.

The ASE noise component delayed by the spectral delay 40 by the amount depending on its wavelength enters the port B of the optical circulator 38 and outputs through a port C into a polarization controller 46. The polarization controller 46 has the same function as that of the polarization controller 22 and controls the polarization of the output light from the port C of the optical circulator 38 under the control of a controller 50.

Figure 5:
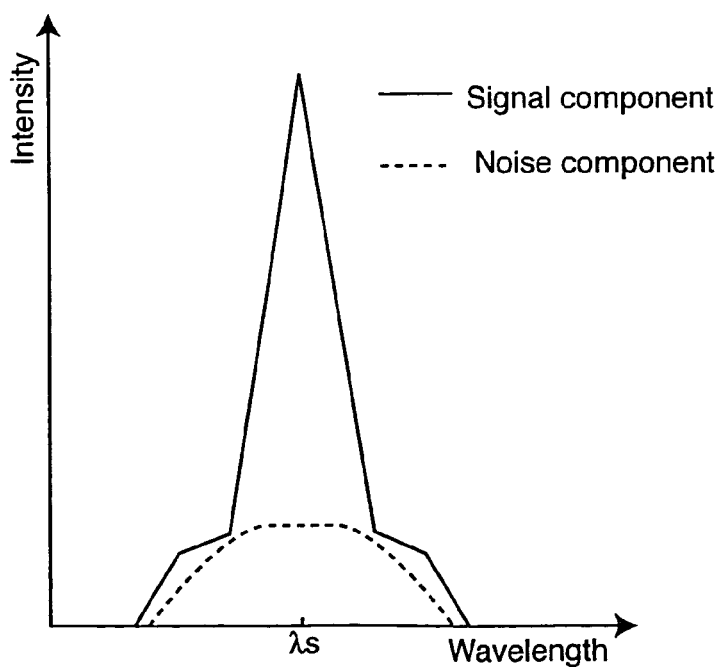
FIG. 5 is a spectrum example of an output light from the combiner of FIG. 1.

The combiner 48 combines the output light from the delay 36, namely the first component output from the arm 1, with the output light from the polarization controller 46, namely the second component output from the arm 2. Based on the function of the half wavelength plate 32 in the arm 1, the polarization direction of the first component becomes basically the same with the polarization direction of the second component in the arm 2. Accordingly, the noise component included in the first component is capable of interfering with the second component (the noise component) when they are combined by the combiner 48. Since the optical phase of the ASE noise in the arm 2 is reversed or shifted by $\pi$ by the spectral delay 40, the ASE noise component is reduced after the combination by the combiner 48. The ASE noise is reduced by 6 dB on the average. FIG. 5 shows a spectrum example of the output light from the combiner 48. The horizontal axis expresses the wavelength, and the vertical axis expresses the intensity. Because of the interference, the ASE noises within the signal wavelength band are reduced drastically, by approximately 6 dB on the average.

A splitter 52 splits the output light from the combiner 48 into two portions and applies one portion to an optoelectric converter 54 and the other to the controller 50. The optoelectric converter 54 converts the signal light including the ASE noise from the splitter 52 into an electric signal. A data demodulator 56 demodulates data from the electric signal output from the optoelectric converter 54.

When optical time division multiplexing is used, a demultiplexer to demultiplex time-division-multiplexed optical signals is disposed in front of the optoelectric converter 54.

The controller 50 controls the polarization controller 46 according to the signal light with the suppressed ASE noise from the splitter 52 so as to maximize the OSNR of the signal light.

Although the half wavelength plate 32 is disposed in the arm 1 in the configuration shown in FIG. 1, it is also applicable to dispose a similar half wavelength plate in the arm 2. In addition, it is applicable that the polarization controller 46 has a function corresponding to that of a half wavelength plate in the arm 2. Furthermore, it is applicable to dispose a polarization rotator such as a Faraday rotator on each of the arm 1 and 2 so that the polarization directions of the first and second components become basically the same in the combiner 48.

Figure 6:
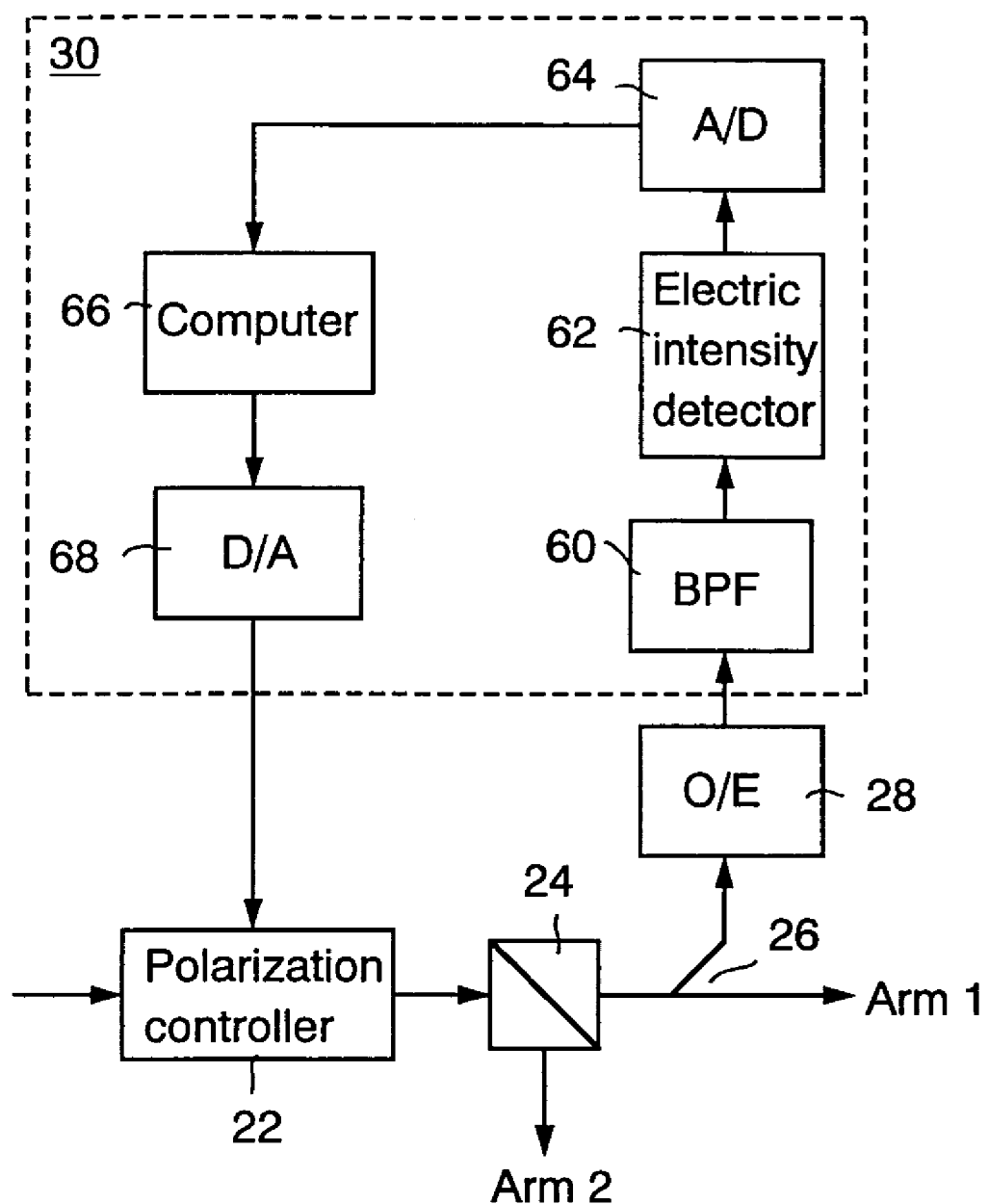
FIG. 6 is a schematic block diagram of a feedback control system to control the polarization controller of FIG. 1.

FIG. 6 shows a schematic block diagram of a feedback control system for the polarization controller 22. A bandpass filter (BPF) 60 extracts a base repetition frequency component, namely a clock frequency component, of the signal light out of the output from the optoelectric converter 28. An electric intensity detector 62 detects the amplitude of the clock frequency component extracted by the BPF 60 and outputs a voltage signal indicating the amplitude. An A/D converter 64 converts the output voltage signal from the electric intensity detector 62 into a digital signal and applies the digital signal to a computer 66. The computer 66 generates a digital control signal for the polarization controller 22 to make the output value from the A/D converter 64 higher and applies the generated signal into a D/A converter 68. The D/A converter 68 converts the digital control signal from the computer 66 into an analogue control signal and applies the analogue control signal to the polarization controller 22.

In such a feedback control loop, the computer 66 controls the polarization controller 22 so as to maximize the output voltage from the A/D converter 64, that is, to maximize the intensity of the signal light in the arm 1. Accordingly, every signal light included in the output light from the OBPF 20 flows into the arm 1 as long as its polarization is kept linear.

Figure 7:
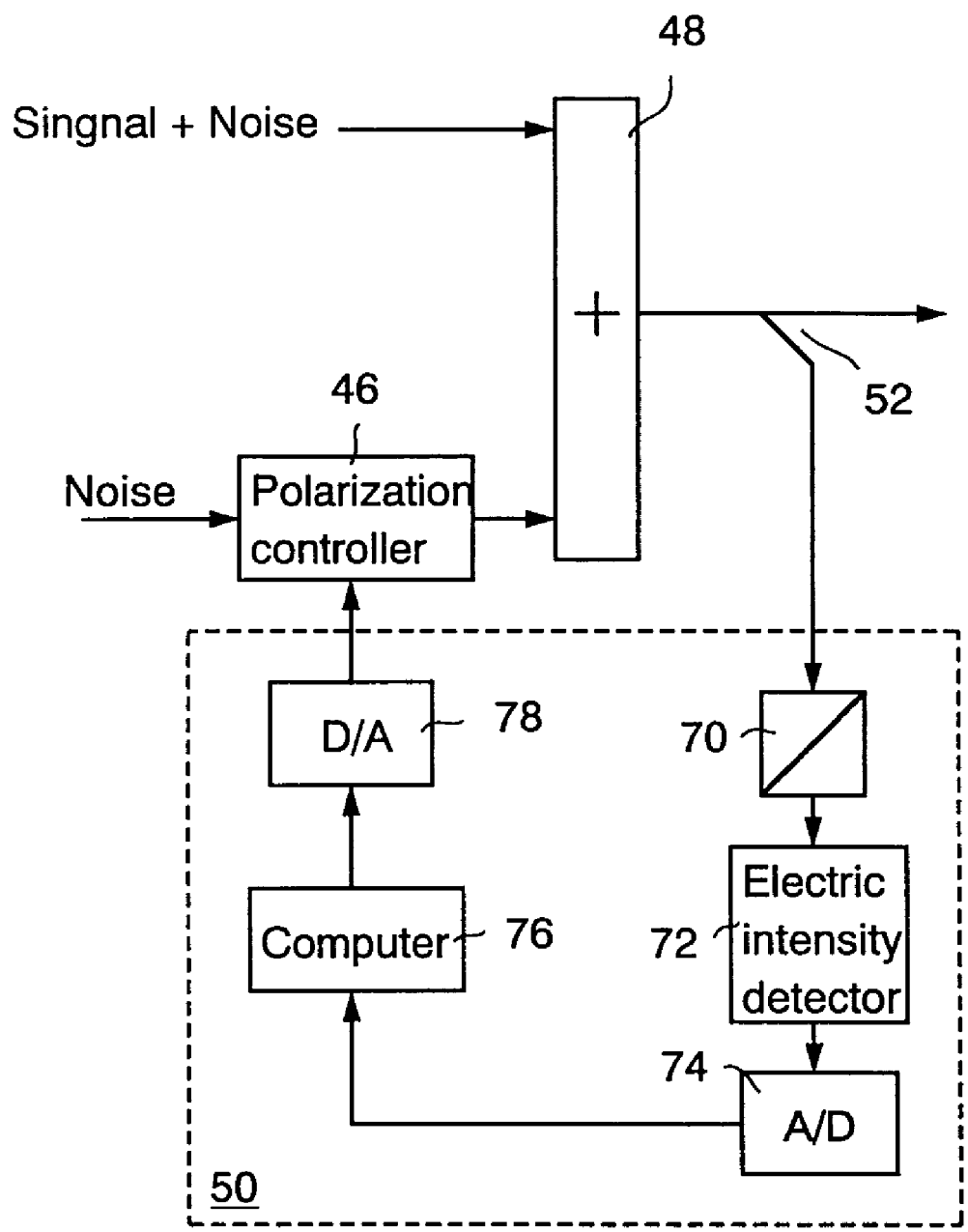
FIG. 7 is a schematic block diagram of a first feedback control system to control the polarization controller of FIG. 1.

FIG. 7 shows a schematic block diagram of a first feedback control system to control the polarization controller 46. A polarizer 70 extracts a polarization component orthogonal to the polarization direction of the signal light out of the signal light with the suppressed ASE noise from the splitter 52. Since the polarization direction of the signal light on the output of the combiner 48 is already known, it is easy to dispose the polarizer 70 so as to be capable of extracting the polarization orthogonal to the polarization direction of the signal light.

An optical intensity detector 72 detects the intensity of the output light from the polarizer 70. An A/D converter 74 converts the analogue output from the optical intensity detector 72 into a digital signal and applies the digital signal to a computer 76. The computer 76 generates a digital control signal for the polarization controller 46 to lower the detected optical intensity by the optical intensity detector 72. A D/A converter 78 converts the digital control signal into an analogue control signal and applies the analogue control signal to a control terminal of the polarization controller 46. The polarization controller 46 controls the polarization of the input signal according to the control signal from the D/A converter 78.

With such a feedback control loop, the computer 76 controls the polarization direction of the ASE noise in the arm 2 using the polarization controller 46 so as to minimize the ASE noise with the polarization orthogonal to the polarization of the signal light on the output of the combiner 48.

The reasons why the polarization controller 46 is controlled so as to maximize the OSNR of the output light from the combiner 48 according to the configuration shown in FIG. 7 are explained below. That is, the component detected by the optical intensity detector 72 is a component of the signal light in the arm 2 with a polarization orthogonal to the polarization of the signal light in the arm 1 and does not contribute to the interference (the suppressing process of the noise) between both arms in the combiner 48. Accordingly, the optical intensity detector 72 finally detects a component remained as noise. To control the polarization controller 46 to minimize the residual component is to adjust the polarization of the signal light in the arm 1 and the polarization of the signal light in the arm 2 so as to be parallel from each other when the combination is performed in the combiner 48. In other words, obtaining the maximum interference effect such that the noise included in the output light from the combiner 48 is fully suppressed.

Figure 8:
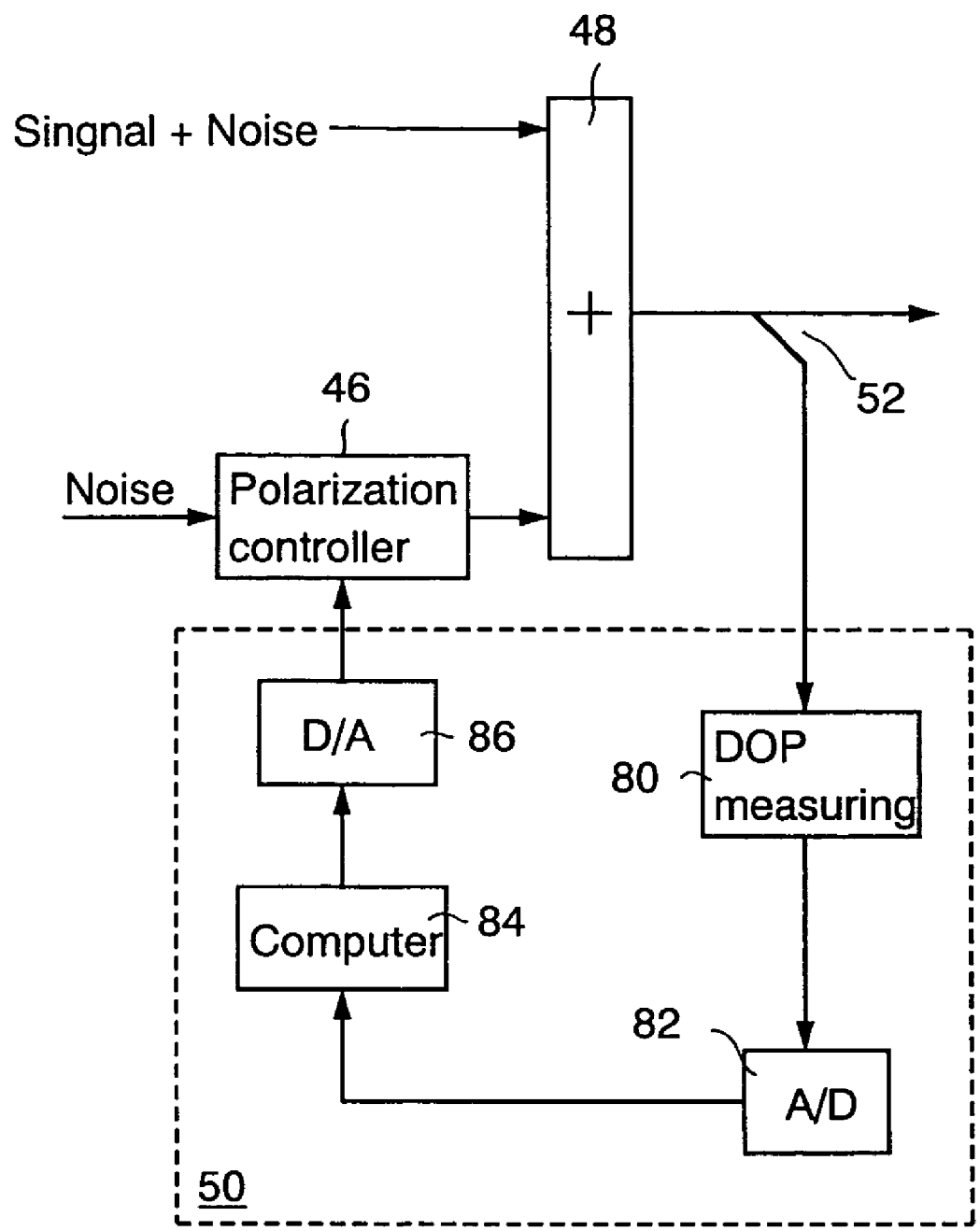
FIG. 8 is a schematic block diagram of a second feedback control system to control the polarization controller of FIG. 1.

FIG. 8 shows a schematic block diagram of a second feedback control system to control the polarization controller 46. A degree of polarization (DOP) measuring device 80 measures a DOP of the output light from the splitter 52, namely a DOP of the output light from the combiner 48. An A/D converter 82 converts the measured result of the DOP measuring device 80 into a digital signal and applies the digital signal to a computer 84. The computer 84 generates a digital signal for the polarization controller 46 to increase the DOP value measured by the DOP measuring device 80. A D/A converter 86 converts the digital control signal into an analogue control signal and applies the analogue signal to the control terminal of the polarization controller 46. The polarization controller 46 controls the polarization of the input signal according to the control signal from the D/A converter 86.

According to such a feedback control loop, the computer 84 controls the polarization direction of the ASE noise in the arm 2 using the polarization controller 46 to maximize the DOP of the output light from the combiner 48. For instance, when the polarization of the light in the arm 1 fluctuates, the polarization state of the output light from the combiner 48 also fluctuates accordingly. By controlling the polarization of the light (ASE noise) in the arm 2 to maximize the DOP of the output light from the combiner 48, the OSNR of the output light from the combiner 48 can be controlled being maximum, even if the polarization state of the light (the signal light and ASE noise) in the arm 1 fluctuates.

The reasons why the polarization controller 46 is controlled to maximize the OSNR of the output light from the combiner 48 according to the configuration shown in FIG. 8 are described below. That is, the lights in the arms 1 and 2 are linear polarization components orthogonal to each other split by the PBS 24. Since the polarization state of each polarization component is linear, the DOP of each polarization component is approximately 100%. Accordingly, when the combiner 48 combines the lights from the arms 1 and 2 on condition that the planes of (linear) polarizations of the arms 1 and 2 are parallel from each other, that is, on condition that the maximum interference effect is obtained, the DOP of the combined signal light is almost 100%. However, when the lights from the arms 1 and 2 are combined on condition that the planes of (linear) polarizations of the arms 1 and 2 are not parallel from each other, the DOP of the combined signal light is reduced because the combined signal light ends up having two orthogonal polarization components. Therefore, the control of the polarization controller 46 to maximize the DOP, means making the polarization of the light in the arm 2 and the polarization of the light in the arm 2 parallel and thus obtaining the maximum interference effects. This also means maximizing the noise suppression in the output signal light from the combiner 48.

Figure 9:
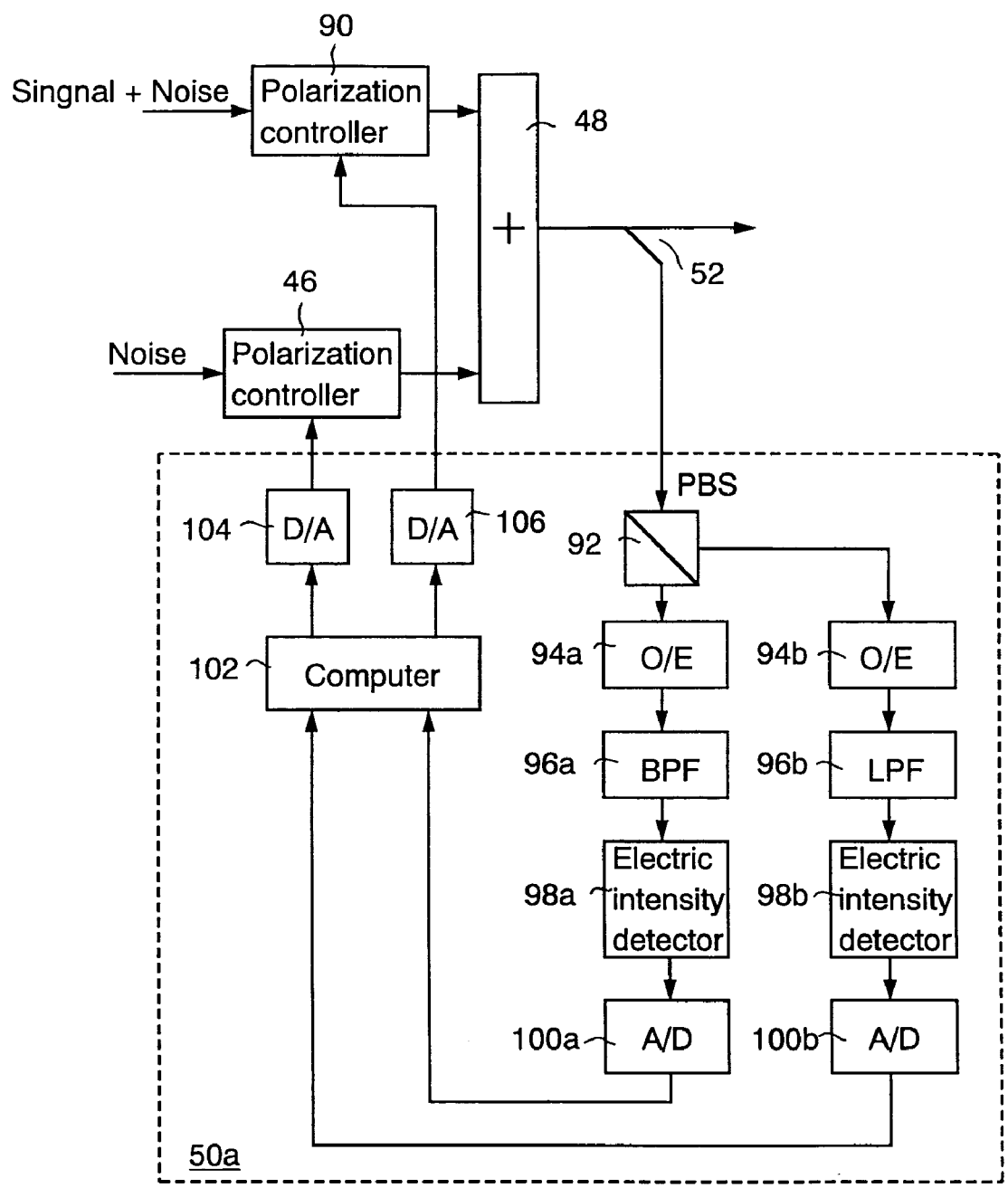
FIG. 9 is a schematic block diagram of a third feedback control system to control the polarization controller of FIG. 1.

FIG. 9 shows a schematic block diagram of a third feedback control system to control the polarization controller 46. This configuration is effective on condition that the fluctuation of polarization state of the first component composed of the signal light and ASE noise in the arm 1 cannot be neglected. A polarization controller 90 is disposed in the arm 1 to reduce the influence of the fluctuation of polarization state of the first component in the arm 1. The controller 50*a* has a function to control both polarization controllers 46 and 90.

A polarization beam splitter 92 splits the light from the splitter 52 into a polarization component of the signal light and an orthogonal polarization component and applies the former to an optoelectric converter 94*a* and the latter to an optoelectric converter 94*b*. Each of the optoelectric converters 94*a* and 94*b* converts the input light into an electric signal with the corresponding intensity.

The output from the optoelectric converter 94*a* is applied to a bandpass filter (BPF) 96*a* and the output from the optoelectric converter 94*b* is applied to a lowpass filter (LPF) 96*b*. The BPF 96*a* extracts a base repetition frequency (the clock frequency) component of the signal transmitted from the optical transmitter 10 to the optical receiver 14 out of the output from the optoelectric converters 94*a*. An electric intensity detector 98*a* detects the electric intensity, namely the amplitude of the output from the BPF 96*a*. The LPF 96*b* detects the DC or low frequency component, namely the noise component out of the output from the optoelectric converters 94*b*. An electric intensity detector 98*b* detects the electric intensity, namely the amplitude of the output from the LPF 96*b*.

The intensity of the signal component after the suppression of the ASE noise is detected using the optoelectric converter 94*a*, the BPF 96*a*, and the electric intensity detector 98*a*. Furthermore, the intensity of the noise remained after the suppression of the ASE noise is detected using the optoelectric converter 94*b*, the LPF 96*b*, and the electric intensity detector 98*b*.

The detected result by the electric intensity detector 98*a* is converted into a digital signal by an A/D converter 100*a* and applied to a computer 102. Similarly, the detected result by the electric intensity detector 98*b* is converted into a digital signal by an A/D converter 100*b* and applied to the computer 102.

The computer 102 generates a digital control signal for the polarization controller 90 so as to increase the intensity of the output from the electric intensity detector 98*a*, namely the intensity of the clock frequency component and also generates a digital control signal for the polarization controller 46 so as to decrease the intensity of the output from the electric intensity detector 98*b*, namely the intensity of the noise component. Each digital control signal is converted into an analogue control signal by D/A converter 104, 106 and applied to the control terminal of the polarization controller 46, 90. The polarization controller 46, 90 controls the polarization of the input signal according to the control signal from the D/A converter 104, 106.

According to such a feedback loop, the computer 102 controls the polarization direction of the first component in the arm 1 using the polarization controller 90 so as to maximize the intensity of the clock frequency component after the suppression of the ASE noise and also controls the polarization direction of the ASE noise in the arm 2 using the polarization controller 46 so as to minimize the intensity of the noise after the suppression of the ASE noise.

In the configuration shown in FIG. 9, by maximizing the signal clock component detected by the BPF 96*a*, the signal component included in the output signal light from the combiner 48 can be maximized in such a way that the polarization state of the signal component is kept constant. On the other hand, by minimizing the electric intensity detected by the LPF 96*b*, the noise component in the arm 2 having the polarization direction different from the polarization direction of the signal component can be minimized. Because the polarization directions of the lights in both arms 1 and 2 are controlled, it is possible to coincide the polarization directions of the lights in the arms 1 and 2 by the combiner 48, even if the polarization directions of the lights in the arms 1 and 2 are fluctuated. Consequently, the OSNR on the output of the combiner 48 can be maximized.

In wavelength division multiplexing (WDM) transmission, after a WDM signal is demultiplexed into respective signal wavelengths, a receiver having the same configuration with the optical receiver 14 can be used. However, a wavelength demultiplexer to demultiplex a WDM signal light into signal lights with respective wavelengths should be disposed instead or in front of the optical bandpass filter 20.

As readily understandable from the aforementioned explanation, according to the invention, the noise accumulated within a signal band is effectively suppressed and thus the OSNR is improved.

While the invention has been described with reference to the specific embodiment, it will be apparent to those skilled in the art that various changes and modifications can be made to the specific embodiment without departing from the spirit and scope of the invention as defined in the claims.

The invention claimed is:

1. A noise suppressing method comprising:
    dividing an input light including a signal light and noise light within a signal wavelength band of the signal light into a first component with a first polarization direction parallel to a polarization direction of the signal light and a second component with a polarization direction orthogonal to the first polarization and applying the first component to a first arm and the second component to a second arm;
    shifting an optical phase of the second component in the second arm so that the optical phase of the second component in the second arm differs by $\pi$ from the first component in the first arm;
    combining the first component output from the first arm and the second component output from the second arm to cause the noise lights included in the first and second components interfere with each other; and
    adjusting the polarization of the second component in the second arm to maximize a SNR of the combined light by the combining step,
    wherein the adjusting the polarization of the second component in the second arm measures a degree of polarization of the combined light and adjusts the polarization direction of the second component in the second arm to maximize the degree of polarization.

2. The method of claim 1 wherein the polarization-dividing comprises:
    detecting an intensity of a base repetition frequency component out of the first component in the first arm; and
    adjusting the polarization of the signal light to increase the intensity of the base repetition frequency component.

3. The method of claim 1 wherein the polarization-dividing comprises:
    extracting a light within the signal wavelength band from the input light;
    detecting an intensity of the base repetition frequency component out of the first component in the first arm; and
    adjusting the polarization of the extracted light to increase the intensity of the base repetition frequency component.

4. The method of any one of claims 1 through 3 wherein the optical phase shifting comprises shifting the optical phase of the second component in the second arm according to its wavelength using a spectral delay having a delay amount that differs according to a wavelength.

5. A noise suppressing method comprising:
    dividing an input light including a signal light and noise light within a signal wavelength band of the signal light into a first component with a first polarization direction parallel to a polarization direction of the signal light and a second component with a polarization direction orthogonal to the first polarization and applying the first component to a first arm and the second component to a second arm;
    shifting an optical phase of the second component in the second arm so that the optical phase of the second component in the second arm differs by $\pi$ from the first component in the first arm;
    combining the first component output from the first arm and the second component output from the second arm to cause the noise lights included in the first and second components to interfere with each other; and
    adjusting the polarization of the second component in the second arm to maximize a SNR of the light combined by the combining,
    wherein the adjusting the polarization of the second component in the second arm extracts the component with the polarization orthogonal to the polarization direction of the signal light included in the combined light, from the combined light and adjusts the polarization of the second component in the second arm to maximize the intensity of the extracted component.

6. A noise suppressing method comprising:
    dividing an input light including a signal light and noise light within a signal wavelength band of the signal light into a first component with a first polarization direction parallel to a polarization direction of the signal light and a second component with a polarization direction orthogonal to the first polarization and applying the first component to a first arm and the second component to a second arm;
    shifting an optical phase of the second component in the second arm so that the optical phase of the second component in the second arm differs by $\pi$ from the first component in the first arm;
    combining the first component output from the first arm and the second component output from the second arm to cause the noise lights included in the first and second components to interfere with each other;
    dividing the light combined by the combining into a third component with a polarization parallel to the polarization direction of the signal light included in the combined light and a fourth component with a polarization orthogonal to the polarization direction of the third component;
    converting each of the third and fourth components into a first and a second electric signal, respectively;
    detecting the intensity of a base repetition frequency component of the signal light out of the first electric signal of the third component;
    detecting the intensity of a low frequency component out of the second electric signal of the fourth component;
    controlling the polarization direction of the first component in the first arm to maximize the intensity of the base repetition frequency component; and
    controlling the polarization direction of the second component in the second arm to minimize the intensity of the low frequency component.

7. A noise suppressor comprising:
    a polarization divider to divide an input light including a signal light and a noise light within a signal wavelength band of the signal light into a first component with a polarization parallel to a polarization direction of the signal light and a second component with a polarization orthogonal to the polarization direction of the first component and to apply the first component to a first arm and the second component to a second arm;
    an optical phase shifter disposed in the second arm to shift the optical phase of the second component in the second arm so that the optical phase of the second component in the second arm differs by $\pi$ from the first component in the first arm;
    a combiner to combine the first component output from the first arm and the second component output from the second arm to cause the noise lights included in the first and second components to interfere with each other; and a second polarization adjuster to adjust the polarization of the second component in the second arm to maximize a SNR of the combined light from the combiner, wherein the second polarization adjuster comprises a polarization controller disposed in the second arm to control the polarization of the second component and a controller to extract a component with a polarization orthogonal to the polarization direction of the signal light included in the combined light out of the combined light from the combiner and to control the polarization controller so as to minimize the optical intensity of the extracted component.

8. A noise suppressor comprising:

a polarization divider to divide an input light including a signal light and a noise light within a signal wavelength band of the signal light into a first component with a polarization parallel to a polarization direction of the signal light and a second component with a polarization orthogonal to the polarization direction of the first component and to apply the first component to a first arm and the second component to a second arm;

an optical phase shifter disposed in the second arm to shift the optical phase of the second component in the second arm so that the optical phase of the second component in the second arm differs by $\pi$ from the first component in the first arm;

a combiner to combine the first component output from the first arm and the second component output from the second arm to cause the noise lights included in the first and second components to interfere with each other;

a first polarization controller disposed in the first arm to control the polarization of the first component;

a second polarization controller disposed in the second arm to control the polarization of the second component;

a polarization beam splitter to split the combined light from the combiner into a third component with a polarization parallel to the polarization direction of the signal light included in the combined light and a fourth component with a polarization orthogonal to the polarization direction of the third component;

an optoelectric converter to convert each of the third and fourth components into a first and a second electric signal, respectively;

a bandpass filter to detect the intensity of a base repetition frequency component of the signal light out of the first electric signal of the third component;

a lowpass filter to detect the intensity of a low frequency component out of the second electric signal of the fourth component; and a controller to control the first polarization controller to maximize the intensity of the base repetition frequency component and to control the second polarization controller to minimize the intensity of the low frequency component.

9. A noise suppressor comprising:

a polarization divider to divide an input light including a signal light and a noise light within a signal wavelength band of the signal light into a first component with a polarization parallel to a polarization direction of the signal light and a second component with a polarization orthogonal to the polarization direction of the first component and to apply the first component to a first arm and the second component to a second arm;

an optical phase shifter disposed in the second arm to shift the optical phase of the second component in the second arm so that the optical phase of the second component in the second arm differs by $\pi$ from the first component in the first arm;

a combiner to combine the first component output from the first arm and the second component output from the second arm to cause the noise lights included in the first and second components to interfere with each other; and a second polarization adjuster to adjust the polarization of the second component in the second arm to maximize a SNR of the combined light from the combiner, wherein the second polarization adjuster comprises a polarization controller disposed in the second arm to control the polarization of the second component, and a controller to measure a degree of polarization of the combined light from the combiner and to control the polarization controller to maximize the degree of polarization.

10. The apparatus of claim 9 wherein the polarization divider comprises:

a base repetition frequency component intensity detector to detect an intensity of a base repetition frequency component out of the first component in the first arm; and a polarization adjuster to adjust the polarization of the signal light to increase the intensity of the base repetition frequency component.

11. The apparatus of claim 9 wherein the polarization divider comprises:

an optical bandlimit filter to extract a signal wavelength band of the signal light from the input light;

a base repetition frequency component intensity detector to detect an intensity of a base repetition frequency component out of the first component in the first arm; and a polarization adjuster to adjust the polarization of the output light from the optical bandlimit filter to increase the intensity of the base repetition frequency component.

12. The apparatus of claim 9 wherein the optical phase shifter comprises a spectral delay having a delay amount which differs according to a wavelength, and an optical circulator to apply the second component in the second arm to the spectral delay and to return the output light from the spectral delay into the second arm.

13. The apparatus of claim 9 further comprising a phase plate to rotate polarization.

14. The apparatus of claim 13 wherein the phase plate is disposed in the first arm.

15. The apparatus of claim 13 wherein the phase plate is disposed in the second arm.

* * * * *

UNITED STATES PATENT AND TRADEMARK OFFICE
CERTIFICATE OF CORRECTION

PATENT NO. : 7,308,204 B2  
APPLICATION NO. : 10/849298  
DATED : December 11, 2007  
INVENTOR(S) : Michiaki Hayashi It is certified that error appears in the above-identified patent and that said Letters Patent is hereby corrected as shown below:

Column 9, line 23, Claim 1   After the word "components", Insert --to--

Signed and Sealed this

Second Day of September, 2008

JON W. DUDAS  
*Director of the United States Patent and Trademark Office*